United States Patent [19]

Dorsey et al.

[11] 4,422,947

[45] Dec. 27, 1983

[54] WELLBORE FLUID

[75] Inventors: David L. Dorsey; Wallace T. Corley, both of Houston, Tex.

[73] Assignee: Mayco Wellchem, Inc., Houston, Tex.

[21] Appl. No.: 218,055

[22] Filed: Dec. 19, 1980

[51] Int. Cl.$^3$ .............................................. C09K 7/02
[52] U.S. Cl. .............................. 252/8.5 C; 252/8.5 A; 252/8.55 R
[58] Field of Search ............. 252/8.5 A, 8.5 C, 8.55 R

[56] References Cited

U.S. PATENT DOCUMENTS

| | | | |
|---|---|---|---|
| 2,570,947 | 10/1951 | Himel et al. | 252/8.5 C |
| 3,198,268 | 8/1965 | Lindblom et al. | 175/72 |
| 3,208,526 | 9/1965 | Patton et al. | 166/38 |
| 3,243,000 | 3/1966 | Patton et al. | 175/65 |
| 3,294,681 | 12/1966 | Stearns et al. | 252/8.5 C |
| 3,872,018 | 3/1975 | Alexander | 252/8.5 A |
| 3,898,165 | 8/1975 | Ely et al. | 252/8.55 R |
| 3,953,336 | 4/1976 | Daigle | 252/8.5 A |
| 3,988,246 | 10/1976 | Hartfiel | 252/8.5 A |
| 3,993,570 | 11/1976 | Jackson et al. | 252/8.5 A |
| 4,090,968 | 5/1978 | Jackson et al. | 252/8.5 A |
| 4,147,211 | 4/1979 | Sandiford | 166/270 |

FOREIGN PATENT DOCUMENTS 2000799  1/1979  United Kingdom ............. 252/363.5

*Primary Examiner*—Herbert B. Guynn
*Attorney, Agent, or Firm*—Pravel, Gambrell, Hewitt, Kirk & Kimball

[57] ABSTRACT

A clay-based or clay-free aqueous thixotropic wellbore fluid having improved fluid loss control, desirable flow characteristics and low shale sensitivity for use in drilling a well comprising water or a brine base including an effective amount of an additive comprising a crosslinked potato starch, a heteropolysaccharide derived from a carbohydrate by bacteria of the genus Xanthomonas, and hydroxyethylcellulose or carboxymethylcellulose, is disclosed. This drilling fluid has been found to be nondamaging to the formations through which the well is drilled.

16 Claims, No Drawings

WELLBORE FLUID

BACKGROUND OF THE INVENTION

This invention relates to wellbore fluids, including drilling fluids, completion fluids, workover fluids, packer fluids, that is, all of those fluids which are employed over the course of the life of a well, usually drilled for the production of oil or gas. It can be used for wells drilled for injection or production of fluids into or from subterranean formations.

Generally, wellbore fluids will be either clay-based or brines, which are clay-free. These two classes are exclusive, that is, clay-based drilling fluids are not brines. A wellbore fluid can perform any one or more of a number of functions. For example, the drilling fluid will generally provide a cooling medium for the rotary bit used to drill the wells and a means to carry off the drilled particles. Since great volumes of drilling fluid are required for these purposes, the fluids generally have been based on water. Water alone, however, does not have the capacity to carry the drilled particles from the borehole to the surface or along perform any number of other requirements. Thus, other components are required.

The drilling muds used in oil wells, gas wells and similar boreholes are generally aqueous solutions containing suspended solids and additives designed to impart the required density, viscosity and thixotropic properties to the mud. When such a mud comes into contact with porous subsurface strata, the liquid constitutents tend to filter into the strata. The solids accumulate to form a filter cake on the borehole wall. It is preferable that the quantity of liquid thus lost to the surrounding formation and the thickness of the filter cake formed be held to a minimum. The loss of large quantities of liquid and the formation of a thick cake adversely affects critical properties of the mud and formation, contaminates fluids present in the formation, leads to the hydration of clays and shales, complicates the interpretation of logs, obscures oil and gas sands that might otherwise be detected, promotes sticking of the drill string in the borehole, and reduces permeability of producing or injection formations. Similar problems are encountered with workover fluids, completion fluids, fracturing fluids and related compositions. Additives are often employed to minimize these and related difficulties encountered with muds in similar positions.

A variety of organic gums and polymers have been used, or proposed for use, as additives in drilling muds and related fluids. These include starch, carboxymethyl cellulose, gum tragacanth, gum karaya, gum ghatti, guar gum, Irish moss, acrylonitrile polymers, phenol-formaldehyde condensation products, Viscoba gum, and the like. Though useful in specific instances, none of these materials has been found wholly satisfactory.

In the drilling fluid class, clay-based fluids have for years preempted the field, because of the traditional and widely held theory in the field that the viscisity suitable for creating a particle carrying capacity in the drilling fluid could be achieved only with a drilling fluid having thixotropic properties, that is, the viscosity must be supplied by a material that will have sufficient gel strength to prevent suspended particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result, the drilling fluids are usually referred to as "muds". The use of clay-based drilling muds has provided the means of meeting two of the basic requirements of drilling fluids, i.e., cooling and particle removal.

Non-argillaceous (clay free) wellbore fluids based on viscosifiers have been developed, which overcome the problem with the clay-based fluids, of high fluid loss values and accumulation of the mud filter cake on the borehole wall, such as a brine containing a viscosifying amount of magnesia-stabilized hydroxyethylcellulose described in U.S. Pat. No. 3,988,246. The clay-free brines have the advantage of containing hydration-inhibiting materials such as potassium chloride, calcium chloride or the like. Quite apparently any solid particulate material would be easily separated from the brine solution since it is not hydrated. Thus, the properties of the brine are not changed by solid particulate matter from the wellbore.

In addition to soluble brine salts and modified starches, wellbore fluids can contain other conventional wellbore additives, such as hydroxyethylcellulose, gums, lignosulfonate salts such as calcium or chromium lignosulfonates, emulsifiers, weighting agents, calcium carbonate, magnesia and other agents. It is understood that not all of these possible constituents will be present in any one wellbore fluid but their selection and use will be governed by other constituents and the use for which the wellbore fluid is intended and is well known to those skilled in the art. Such components may be added to a dry mix package as well.

A common problem for both clay-based and clay-free brine wellbore fluids is water loss. A number of approaches have been employed to prevent water loss into the penetrated formation. For example, lignosulfonate salts are frequently employed for that purpose. Also oil has been employed as a water loss control agent.

Although starches have been employed in clay-based and brine fluids, they have generally not been successful in substantially reducing water loss in the drilling fluid, while at the same time maintaining low amounts of undesirable crosslinking after the mud is compounded, desirable flow characteristics and low shale sensitivity. Shale sensitivity is characterized by dissolution of shale into the drilling solution resulting in a higher drilling fluid viscosity. A drilling fluid with low shale sensitivity is able to tolerate a large amount of drilling solids, whereas a fluid with high shale sensitivity cannot.

Many times in drilling a well, it is necessary to lower the fluid loss and yet maintain desirable flow characteristics to the mud system. When common additivies such as bentonite will no longer give the properties needed, it has been common practice to add small amounts of some polymers in order to lower the water loss of the mud. This has resulted in a number of problems such as, for example: (1) solids too high to accept the polymers presently available on the market, (2) some polymers used were directed almost entirely to controlling flow characteristics without maintaining water loss control, (3) polymers used resulted in adequate water loss control but at the expense of desirable flow characteristics, (4) rheological properties of muds too sensitive to small additions of the available polymers, (5) available polymers were not effective in both fresh and salt water, (6) polymers would not tolerate solids buildup, (7) down hole formations encountered or surface addition of additives (such as some corrosion inhibitors) radically altered the mud properties, or caused the mud system to gel.

Starch additives have previously been used to lower water loss, as described in U.S. Pat. Nos. 3,243,000; 3,988,246; 3,993,570; and 4,090,968, however, no starch additive has heretofore been successful in reducing water loss to extremely low values, while also maintaining low amounts of undesirable crosslinking in the mud after being compounded, desirable flow characteristics, and low shale sensitivity.

It is a feature of the present invention to provide an aqueous thixotropic, stable wellbore fluid which does not damage the formation having improved water loss control, low amounts of undesirable crosslinking, desirable flow characteristics, and low sensitivity to shale.

It is a further feature of the present invention to provide a water loss control additive which is effective for both clay containing and clay-free and fresh water-based and brine-based drilling fluids.

It is an advantage of the present invention that the additive package of this invention results in lower water loss drilling fluid values in NaCl, CaCl$_2$, and KCl brines as well as fresh water than has been found by any prior use of starch additive for water loss control, and at the same time maintain desirable flow characteristics and low shale sensitivity in the drilling fluid.

It is a further advantage that this invention is not pH sensitive and aids in solids control by inhibiting drill solids.

It is a further advantage of the present invention that, unlike other polymers on the market, it will tolerate large amounts of drill solids and yet remain a virtually non-damaging system because of its low water loss.

It is a further advantage of the present invention that water loss reduction is obtained with similarly low values for brines containing NaCl, CaCl$_2$, KCl or mixtures thereof. Previously used additives have shown adequate water loss for one or two of the above brines but not all three as well as water. This is also advantageous economically since the same additive package may be used regardless of the constituents of water or brine being used at the drilling site.

These and other advantages and features will be apparent from the following discussion and description of the invention and several of the embodiments thereof.

SUMMARY OF THE INVENTION

It has been found that an improved aqueous thixotropic wellbore fluid having improved water loss control, low amounts of undesirable crosslinking, desirable flow characteristics and low sensitivity to shale, for use in drilling a well is comprised of water or a brine base including an effective amount of an additive comprising (1) from about 60% to about 98% by weight a potato starch heteropolysaccharide crosslinked with a crosslinking compound having at least two groups that react with hydroxymethyl groups on a glucopyranose unit of the potato starch, (2) from about 1% to about 20% by weight of a heteropolysaccharide derived from a carbohydrate by bacteria of the genus Xanthomonas, and from about 1% to about 20% by weight hydroxyethylcellulose.

An embodiment of the present invention also relates to a dry mix additive package and a liquid concentrate additive for use in aqueous water or brine wellbore fluids. The additive package comprises a mixture of (1) from about 60% to about 98% by weight potato starch heteropolysaccharide crosslinked with a crosslinking compound having at least two groups that react with hydroxymethyl groups on a glucopyranose unit of potato starch, (2) from about 1% to about 20% by weight of a heteropolysaccharide derived from a carbohydrate by bacteria of the genus Xanthomonas, and from about 1% to about 20% by weight hydroxyethylcellulose or carboxymethylcellulose. The liquid concentrate is formed by placing the additive mixture of the above proportions in a liquid carrier in about equal proportions by weight.

DETAILED DESCRIPTION OF THE INVENTION

Numerous derivatives of starch have been described in the art and many have been used in drilling muds. Their synthesis and properties are outlined in detail in hundreds of papers and patents. An excellent compilation of much of this information is presented in "Starch and its Derivatives", 4th Ed., J. A. Rodley, Chapman and Hall, Ltd.; London, 1968. Neither the potato starch product used in the practice of this invention nor the method of preparation is of interest here and forms no part of this invention.

The wellbore fluids of the present invention are formed using either fresh water or brine as the basic fluid and a particularly advantageous additive package. As the term brine is employed herein it means a soluble salt of potassium, sodium or calcium in water. In addition, the brine may contain other soluble salts of, for example, zinc, chromium, iron, copper and the like, usually as impurities. Generally, the chlorides are employed because of availability, but other salts such as the bromides, sulfates and the like can be used. The soluble salts of the brine not only furnish at least part of the weighting material by adjusting the density of the solution, but also typically furnish the cations for inhibiting the fluid against hydration of solid materials.

This invention comprises a water or brine base including an effective amount of an additive comprising: (1) from about 60% to about 98% by weight potato starch heteropolysaccharide crosslinked with a crosslinking compound having at least two groups that react with hydroxymethyl groups on a glucopyranose unit of potato starch, (2) from about 1% to about 20% by weight of a heteropolysaccharide derived from a carbohydrate by bacteria of the genus Xanthomonas, and (3) from about 1% to about 20% by weight hydroxyethylcellulose.

As a preferred embodiment the additive comprises from about 76% to about 92% (more preferably about 84% to about 90%) by weight potato starch heteropolysaccharide crosslinked with a crosslinking compound having at least two groups that react with hydroxymethyl groups on a glucopyranose unit of potato starch, (2) from about 4% to about 12% (most preferably from about 5% to about 8% by weight of a heteropolysaccharide derived from a carbohydrate by bacteria of the genus Xanthomonas, and (3) from about 4% to about 12% (most preferably from about 5% to about 8%) by weight hydroxyethylcellulose.

The potato starch heteropolysaccharide is made by crosslinking potato starch, with a crosslinking compound having at least two groups that react with hydroxymethyl groups on a glucopyranose unit of potato starch. This is applicable whether or not the starch polymer is in the amylose (linear) or amylopectin (branched) configuration. Such crosslinking agents preferably include a phosphorous-oxychloride or urea-formaldehyde which have reactive groups through which the starch polymers may be joined. Such a crosslinked potato starch is available from A. E. Staley Co., Decatur, Ill. and is now sold under the name "CP 141 XP".

This crosslinking of the potato starch is preferably obtained by the reaction of the potato starch and a phosphorus phosoxychloride, although urea-formaldehyde and other compounds having at least two groups which react with hydroxymethyl groups on the glucopyranose units of the pototo starch, may be used in place of phosphorus oxychloride. The degree of crosslinking can be controlled or determined by monitoring changes in the viscosity of aqueous solutions or by chemical analysis for elements of the crosslinking agent. For example, the viscosity of a 1% aqueous solution of the crosslinked potato starch heteropolysaccharide (CP 141 XP) was 4 centipoise by API apparent viscosity standard method. The viscosity will vary by the amount of crosslinking and the parameters of the test, i.e. the temperature or solution contacting can be varied to suit individual needs. Those skilled in the art can determine the suitability of the material being used in the practice of this invention by preparing various solutions, using any convenient standard, and measuring the viscosity. A viscosity peak indicated maximum crosslinking without inhibition of the starch. At this point viscosity began to decrease. While the amount of crosslinking is not critical, and even knowledge of it is not necessary to the practice of this invention, the degree of crosslinking and the desired viscosity of the drilling fluid are matters which would go to determine what portion of the additive mixture would be the crosslinked starch and how much of the mixture would be used to prepare the drilling fluid. The determination of such amounts is well within the skill of the art.

The heteropolysaccharides useful in the practice of this invention are those produced as described in U.S. Pat. Nos. 3,208,526 and 3,198,268 which are incorporated herein by reference for all purposes. The production of this material comprises the fermentation of a carbohydrate aqueous solution with bacteria which indicate *Xanthomonas begoniae, Xanthomonas campestris, Xanthomonas curotae, Xanthomonas hederae, Xanthomonas incanae, Xanthomonas malvacearum, Xanthomonas papavericola, Xanthomonas phaseoli, Xanthomonas pisi,* and *Xanthomonas translucens.* Laboratory work has indicated that production of the heteropolysaccharides is a characteristic trait of all members of the genus Xanthomonas but that certain species of these bacteria produce the polymers with particular efficiency and are therefore more attractive for synthesizing the heteropolysaccharides than are others. *Xanthomonas begoniae, Xanthomonas campestris, Xanthomonas incanae* and *Xanthomonas pisi* are particularly outstanding in this respect.

The most effective carbohydrates for the bacterial action have been found to be glucose, sucrose, fructose, maltose, lactose, galactose, soluble starch, cornstarch and the like. Especially preferred are those heteropolysaccharides formed from the bacterial action of the species *Xanthomonas campestris* upon carbohydrate. Such a product is sold by the Kelco Division of Merck & Company, Houston, Tex. and known as "Kelco XC". Kelco Company is headquartered in San Diego, Calif. Other heteropolysaccharides are useful in the make up of the additive of this invention but the foregoing seaweed, prepared by methods known to those in the art, is preferable in the amounts previously stated.

The third component of the additive mixture of this invention is hydroxyethycellulose, a general purpose viscosifier for low solids drilling, completion, and workover fluids. Specifically designed for the oil field, Cellosize HEC-10 Polymer (Union Carbide Corporation, New York, N.Y.) is a free flowing granular material that has been surface treated to facilitate the preparation of clear homogeneous fluids. Hydroxyethylcellulose is preferred.

The three components of the additive package when used together in the practice of this invention, though individually used as mud additives for various purposes surprisingly provide good water loss prevention while maintaining good rheological properties whether the drilling fluid is made with fresh water or brine, is clay-free or clay-based, thus reducing problems of custom formulation of the additive package.

Other known materials may be added for special purposes in the practice of this invention such as, for example, Cypan, a synethetic organic mud additive polymer of high-molecular weight prepared by polymerizing acrylonitrile to the desired molecular weight and hydrolyzing the polymer. This material, sold by American Cyanimid Company, Refinery Chemicals Department, Bound Brook, N.J., assists in improving temperature stability to drilling fluids.

Other commonly used drilling fluid additives may also be used in the practice of this invention. These additives include, for example, Drispac, a polyanionic cellulose of Phillips Petroleum Company, and Polyox, a polyethylene oxide product sold by Union Carbide.

The additive mixture of the present invention is employed in an effective amount which will provide maximum water loss reduction and beyond which additional additive mixture has little effect. This amount will vary not only as a result of the other components of the brine or water but also as a function of the subterranean formation in which it is employed and can be readily determined by those skilled in the art. As a general observation, it has been found that water loss reduction is obtained with an effective amount of from about 0.2 to about 12 pounds of additive mixture per barrel of the wellbore fluid. Preferably, from about 2 to about 8 pounds of additive per barrel of fluid would be employed. The present invention encompasses the concept of an additive mixture for reduction of water loss in aqueous clay-free wellbore fluids or clay-based wellbore fluids, prepared from fresh water or brine, while maintaining low amounts of undesirable crosslinking, desirable flow characteristics, and low shale sensitivity.

The minimum amount of additive mixture used will vary within the ranges stated depending on the nature of the wellbore fluid, e.g., concentration of salts, other additives, etc., the use to which fluid is to be put, the conditions to be encountered in use, the nature of the formation and the like. Generally, the optimum amount of the additive mixture will fall in these ranges, however, excess amounts of additive mixture may be employed without detriment. Economic consideration and rheological properties will normally determine an upper limit.

In addition to soluble brine salts and the additives of this invention, wellbore fluids can contain other conventional additives, such as, for example, gums, lignosulfonate salts such as calcium or chromium lignosulfonates, emulsifiers, weighting agents, calcium carbonate, magnesia and other agents. It is understood that not all of these possible constituents will be present in any one wellbore fluid but their selection and use will be governed by other constituents and the use for which the wellbore fluid is intended and is well known to those skilled in the art.

The components of the additive package of this invention may be added to a wellbore fluid as individual components or may be preblended as a dry ready-mix additive package, or packages, in such proportions that the relative amounts of each component will be within the above cited ranges. While the foregoing description of this invention has been directed to the production of the drilling fluid itself, the ingredients of the additive of this invention may be premixed in dry form, transported to the well site and then blended into the fluid at the well site in the proportions effective as a water-loss agent. As another embodiment of this invention, the premix may be placed in a carrier liquid which is easily mixed with water in the drilling fluid, such as, for example, Xylene, some alcohols, diesel oil or a petroleum distillate. The dry mixture or the liquid concentrate then is even more easily introduced into the drilling fluid at the well site. The versatility of the additive of this invention allows a premix package to be used due to the relatively small effect upon desired rheological and water loss characteristics caused by variences in the make-up liquid (salt-content) and the strata on the formation being drilled. When the liquid concentrate is prepared, it is usually made up 50% by weight additive with the rest being the liquid. Of course, the strength of the concentrate can vary widely, usually between about 35% to about 70% solids, without adverse effect.

The foregoing more general discussion of this invention will be further exemplified by the following specific examples offered by way of illustration and not limitation of the above-described invention.

SPECIFIC EMBODIMENTS

Example 1

This experiment demonstrates the water loss properties of the potato starch crosslinked with a phosphorus oxychloride, when used alone as the single water loss control additive in a fresh water drilling fluid system. Such a system has previously been used in drilling operations. In this run, 4, 6 and 8 pounds per barrel of crosslinked heteropolysaccharide potato starch (obtained from A. E. Staley Corporation of Decatur, Ill. and referred to as 141) and 40 pounds per barrel Palex No. 2 (a commonly used material to simulate drilling solids for laboratory testing, source: Milwhite Co., Houston, Tex.), were added to fresh water and stirred with a low mixer speed for 20 minutes to assure homogenization of the fluid and solution of the crosslinked potato starch. The drilling fluid was then subjected to an API filter loss test (100 psi differential for 30 minutes). The standard API tests for Gel Strength ("GS", in Pounds per 100 Square Feet), Plastic Viscosity ("PV", in centipoise) and Yield Point ("YP", in Pounds per 100 Square Feet) were also determined to show the rheological properties of the fluid. The test results are given below in Table 1.

TABLE 1

| Components* | | Fresh Water Water Loss ml. | GS | PV | YP | pH |
|---|---|---|---|---|---|---|
| Palex #2 | 40 | 20.0 | 0 | 4 | 3 | 10 |
| 141 conc. | 4 | | | | | |
| Palex #2 | 40 | 11.2 | 0 | 7 | 3 | 10 |
| 141 conc. | 6 | | | | | |
| Palex #2 | 40 | 15.4 | 1–2 | 8 | 9 | 10 |
| 141 conc. | 8 | | | | | |

* = pounds per barrel

The crosslinked heteropolysaccharide potato starch, referred to as 141, when alone combined with Palex drilling solids yields somewhat reduced water loss data compared with high water loss data of drilling fluid alone. The prior art has recognized the use of 141 alone in reducing water loss. The figures shown in Table 1 represent typical water loss data when 141 is employed alone.

Example 2

This experiment demonstrates the water loss properties of a mixture of 90% crosslinked heteropolysaccharide potato starch (as used in Example 1) when combined with 5% of the heteropolysaccharide (prepared by the action of bacteria of the species *Xanthomonas campestris*, referred to as XC polymer, a commercial product of Kelco Company, San Diego, Calif.,) and 5% HEC in a fresh water drilling system. A dry blend of the components, used in the practice of this invention (hereinafter referred to as MAPP) was prepared as a dry pre-mix package and added to the fresh water along with various amounts of Palex #2 and other additives as shown in Table 2. This mixture was stirred to produce a simulated drilling fluid and subjected to the API filter loss test as well as tests for rheological properties of the fluid just as in Example 1. The test results are given in Table 2.

TABLE 2

| Components* | | Fresh Water Water Loss ml. | GS | PV | YP | pH |
|---|---|---|---|---|---|---|
| Palex #2 | 0 | | | | | |
| MAPP conc. | 4 | 22.0 | 0 | 5 | 2 | 10 |
| | 8 | 13.6 | 1 | 17 | 17 | 10 |
| Palex #2 | 0 | | | | | |
| MAPP conc. | 8 | 1.0 | 3 | 25 | 10 | 9 |
| Barite | 14** | | | | | |
| Palex #2 | 20 | 3.2 | 4 | 38 | 12 | 9 |
| Barite | 16** | | | | | |
| Palex #2 | 40 | | | | | |
| MAPP conc. | 0 | HIGH | 0 | 2 | 2 | 10 |
| | 2 | | | | | |
| | 4 | 8.4 | 1 | 10 | 5 | 10 |
| | 6 | 4.8 | 2 | 16 | 15 | 10 |
| | 8 | 4.0 | 3 | 18 | 26 | 10 |
| Palex #2 | 60 | | | | | |
| MAPP conc. | 8 | | | | | |
| Barite | 12** | 2.8 | 4 | 28 | 22 | 9 |
| | 14** | 2.5 | 4 | 29 | 17 | 9 |
| | 16** | 6.8 | 8 | 49 | 27 | 8 |
| Palex #2 | 80 | | | | | |
| MAPP conc. | 4 | HIGH | 5 | 13 | 14 | 10 |
| | 8 | 18.0 | 3 | 20 | 18 | 10 |

* = Pounds per Barrel
** = Amount to give fluid density expressed in Pounds per Gallon As may be seen in Table 2, the addition of the MAPP additive of this invention to the drilling fluid results in considerably decreased water loss values as the concentration of the MAPP additive is is increased. As may be seen by the addition of barite to the fluid, flow water loss values are obtained in clay-based drilling fluid as well as a clay-free drilling fluid. This Table also provides information useful in varying the amount of the water loss additive package with the solids in the fluid as well as the loading of Barite in the fluid.

Example 3

This experiment demonstrates the fluid loss properties of 90% crosslinked heteropolysaccharide potato starch when combined with 5% X-C polymer (prepared by the action of bacteria of the species *Xanthomonas campestris*) and 5% HEC in a aqueous fluid made from a 10% NaCl brine. A dry blend of the components was prepared and added to the brine along with Palex #2 as shown in Table 3. This mixture was stirred and subjected to an API filter loss and properties tests as in Example 1. The tests results are given in Table 3.

TABLE 3

| Components* | | 10% NaCl Fluid Loss ml. | GS | PV | YP | pH |
|---|---|---|---|---|---|---|
| Palex #2 | 40 | | | | | |
| MAPP conc. | 4 | 4.8 | 1 | 9 | 7 | 10 |
|  | 6 | 4.0 | 1 | 13 | 13 | 10 |
|  | 8 | 3.2 | 3 | 22 | 22 | 10 |

* = pounds per barrel

As may be seen in Table 3, higher concentration of MAPP result in marked decreases in fluid loss values while maintaining satisfactory flow properties. A drilling fluid was made with a saturated NaCl solution and 40 ppb Palex #2 and 4 ppb MAPP mixture. Testing of the solution revealed a fluid loss value of 5.2 ml.; yield point of 8 lbs/100 ft.$^2$; a plastic viscosity of 10 cp and an initial gel strength of 1 lb./100 ft.$^2$.

EXAMPLE 4

This experiment demonstrates the water loss properties of the additive mixture of this invention containing 90% crosslinked heteropolysaccharide potato starch (141) when combined with 5% X-C polymer (prepared by the action of bacteria of the species *Xanthomonas campestris*) and 5% HEC in an aqueous fluid made from a 10% CaCl$_2$ brine. A dry blend of the components was prepared and added to the brine along with Palex #2 as shown in Table 4. This mixture was stirred and subjected to API filter loss and rheological properties tests as in Example 1. The test results are given in Table 4.

TABLE 4

| Components* | | Fluid Loss ml. | GS | PV | YP | pH | FV** |
|---|---|---|---|---|---|---|---|
| 10% CaCl$_2$ | | | | | | | |
| Palex #2 | 40 | | | | | | |
| MAPP conc. | 4 | 6.4 | 1 | 8 | 6 | 10 | 34 |
|  | 6 | 3.2 | 1 | 16 | 16 | 10 | 40 |
|  | 8 | 2.0 | 2 | 18 | 18 | 10 | 40 |
| Saturated Solution of CaCl$_2$ | | | | | | | |
| Palex #2 | 40 | | | | | | |
| MAPP | 4 | 6.0 | 5 | 21 | 13 | 10 | |

* = pounds per barrel
** = Funnel Viscosity, Sec.

As may be seen in Table 4, higher concentrations of MAPP additive result in marked decreases in water loss values while maintaining good rheological properties.

EXAMPLE 5

This experiment demonstrates the fluid loss properties of a drilling fluid containing an additive mixture containing 90% crosslinked heteropolysaccharide potato starch, 5% X-C polymer and 5% HEC in a 3% KCL brine system. A dry blend of the components was prepared and added to the brine along with various amounts of Palex #2 as shown in Table 5. This mixture was stirred and subjected to an API filter loss and rheological tests as in Example 1. The test results are given in Table 5.

TABLE 5

| Components | | 3% KCl Water Loss ml. | GS | PV | YP | pH |
|---|---|---|---|---|---|---|
| "Palex #2 | 10 | | | | | |
| MAPP conc. | 2 | 10.0 | 0 | 4 | 1 | 11" |
|  | 4 | 5.2 | 0 | 6 | 3 | 11 |
|  | 6 | 4.0 | 1 | 10 | 5 | 11 |
|  | 8 | 5.2 | 2 | 16 | 14 | 11 |
| "Palex #2 | 20 | | | | | |
| MAPP conc. | 4 | 4.0 | 1 | 7 | 6 | 10" |
|  | 8 | 3.8 | 1 | 13 | 12 | 10 |
| Palex #2 | 80 | 30.0 | 0 | 8 | 2 | 10 |
| MAPP conc. | 4 | 6.2 | 1 | 11 | 3 | 10 |
|  | 6 | 3.0 | 1 | 12 | 11 | 10 |
|  | 8 | 3.2 | 2 | 17 | 13 | 10 |
| "Palex #2 | 80 | | | | | |
| MAPP conc. | 2 | 30.0 | 0 | 8 | 2 | 10" |
|  | 4 | 20.0 | 1 | 10 | 8 | 10 |
|  | 6 | 3.2 | 3 | 14 | 13 | 10 |
|  | 8 | 3.2 | 3 | 19 | 18 | 10 |

As is shown in Table 5, higher concentrations of MAPP result in marked decreases in water loss values while maintaining good rheological properties.

When water loss values obtained by addition of MAPP to wellbore fluids are compared to those obtained by addition of additives heretofore used and proposed by prior patents, outstanding water loss control is obtained by addition of MAPP, the additive package of this invention, without sacrificing rheological properties of the fluid.

Those skilled in the art will be able to make variations of this invention from the foregoing description and examples of this invention without departing from the scope and spirit of the claimed invention.

We claim:

1. An aqueous wellbore fluid having improved water loss control, desirable flow characteristics, and low sensitivity to shale for use in drilling a well, comprising; water or a brine base including an effective amount of an additive consisting (1) from about 60% to about 98% by weight potato starch heteropolysaccharide crosslinked with a crosslinking compound having at least two groups that react with hydroxymethyl groups on a glucopyranose unit of potato starch, said crosslinking compound being selected from the group consisting of phosphorus oxychloride and urea-formaldehyde, (2) from about 1% to about 20% by weight of a heteropolysaccharide derived from a carbohydrate by bacteria of the genus Xanthomonas, and (3) from about 1% to about 20% by weight hydroxyethylcellulose.

2. The wellbore fluid according to claim 1, including from about 0.2 ppb to about 12 ppb of the additive consisting (1) from about 76% to about 92% of the cross-linked potato starch, (2) from about 4% to about 12% by weight of the heteropolysaccharide derived from a carbohydrate by bacteria of the genus Xanthomonas, and (3) from about 4% to about 12% by weight hydroxyethylcellulose.

3. The wellbore fluid according to claim 1, including from about 2 ppb to about 8 ppb of the additive consisting of (1) from about 84% to about 90% of the cross-linked potato starch, (2) from about 5% to about 8% by weight of the heteropolysaccharide derived from a carbohydrate by bacteria of the genus Xanthomonas, and (3) from about 5% to about 8% by weight hydroxyethylcellulose.

4. The wellbore fluid according to claim 1, where the fluid is clay-based.

5. The wellbore fluid according to claim 1, where the fluid is clay-free.

6. The wellbore fluid of claim 1, having a brine base formed by soluble salts or mixture of salts.

7. The wellbore fluid according to claim 6, where the brine forming soluble salt is NaCl, CaCl$_2$, or KCl.

8. The wellbore fluid according to claim 1, where the heteropolysaccharide is derived a carbohydrate by the action of *Xanthomonas campestris*.

9. The wellbore fluid according to claim 1 where the cross-linking agent is phosphorus oxychloride.

10. A dry mix additive package for use in aqueous water or brine wellbore fluids consisting of a mixture of (1) from about 60% to about 90% by weight of a potato starch heteropolysaccharide crosslinked with a crosslinking compound having at least two groups that react with two hydroxymethyl groups on a glucopyranose unit of the potato starch, said crosslinking compound being selected from the group consisting of phosphorus oxychloride and urea-formaldehyde, (2) from about 1% to about 20% by weight of a heteropolysaccharide derived from a carbohydrate by bacteria of the genus Xanthomonas, and (3) from about 1% to about 20% by weight hydroxyethylcellulose or carboxymethylcellulose.

11. The dry mix additive package according to claim 10, where the heteropolysaccharide is derived a carbohydrate by the action of *Xanthomonas campestris*.

12. The dry mix additive package according to claim 10 where the potato starch is cross-linked with phosphorus oxychloride.

13. A liquid concentrate water loss control additive for use in aqueous water or brine wellbore fluids consisting of the additive mixture of (1) from about 60% to about 90% by weight potato starch heteropolysaccharide crosslinked with a crosslinking compound having at least two groups that react with hydroxymethyl groups on a glucopyranose unit of the potato starch, said crosslinking compound being selected from the group consisting of phosphorus oxychloride and urea-formaldehyde, (2) from about 1% to about 20% by weight of a heteropolysaccharide derived from a carbohydrate by bacteria of the genus Xanthomonas and (3) from about 1% to about 20% hydroxyethycellulose and a carrier liquid easily mixed with water in the wellbore fluid.

14. The liquid concentrate additive according to claim 13, wherein the heteropolysaccharide is derived a carbohydrate by the action of *Xanthomonas campestris*.

15. The liquid concentrate additive according to claim 13, where the carrier liquid is an alcohol or diesel oil.

16. The liquid concentrate additive according to claim 13 where the potato starch is cross-linked with phosphorus oxychloride.

* * * * *